United States Patent
Horn et al.

(10) Patent No.: US 9,392,394 B2
(45) Date of Patent: Jul. 12, 2016

(54) SYSTEM FOR ENABLING SPONSORED USER IDENTITIES ON A MOBILE DEVICE

(71) Applicant: MOVIRTU LIMITED, London (GB)

(72) Inventors: Chris Horn, Wokingham (GB); Glen Murray, Lower Basildon (GB)

(73) Assignee: Movirtu Limited (GB)

( * ) Notice: Subject to any disclaimer, the term of this patent is extended or adjusted under 35 U.S.C. 154(b) by 0 days.

(21) Appl. No.: 14/074,167

(22) Filed: Nov. 7, 2013

(65) Prior Publication Data

US 2014/0128041 A1    May 8, 2014

Related U.S. Application Data

(60) Provisional application No. 61/723,586, filed on Nov. 7, 2012.

(51) Int. Cl.
| | |
|---|---|
| *H04M 3/42* | (2006.01) |
| *H04W 4/00* | (2009.01) |
| *G06Q 30/02* | (2012.01) |

(52) U.S. Cl.
CPC .............. *H04W 4/003* (2013.01); *G06Q 30/02* (2013.01)

(58) Field of Classification Search
CPC .............................. H04W 4/003; G06Q 30/02
See application file for complete search history.

(56) References Cited

U.S. PATENT DOCUMENTS

| | | | |
|---|---|---|---|
| 7,945,244 B1 | 5/2011 | Delaet et al. | |
| 8,571,564 B2 | 10/2013 | Horn et al. | |
| 2002/0023131 A1* | 2/2002 | Wu et al. | 709/205 |
| 2007/0050463 A1* | 3/2007 | Shaffer et al. | 709/207 |
| 2008/0130663 A1* | 6/2008 | Fridman et al. | 370/401 |
| 2012/0046011 A1* | 2/2012 | Thakur et al. | 455/406 |
| 2014/0050110 A1 | 2/2014 | Jerath et al. | |
| 2014/0074941 A1* | 3/2014 | He | 709/206 |

* cited by examiner

*Primary Examiner* — Olumide T Ajibade Akonai
(74) *Attorney, Agent, or Firm* — Donna Flores; Fleit Gibbons Gutman Bongini & Bianco P.L.

(57) ABSTRACT

A system for enabling brands to engage with mobile users having sponsored identities dedicated to those specific brands. Brands are enabled to give mobile numbers to individual users without the need of mobile infrastructure investment by the brand itself and without the need of the end user to purchase a specific mobile device or SIM and without the need for the brand to act as a Mobile Virtual Network Operator. The system therefore allows brands to engage with mobile users using dedicated sponsored identities in a much faster and more engaging way and without the need of mobile infrastructure investment by the brand itself.

10 Claims, 5 Drawing Sheets

SYSTEM FOR ENABLING SPONSORED USER IDENTITIES ON A MOBILE DEVICE

PRIORITY CLAIM

This application claims priority to U.S. Provisional Application No. 61/723,586, filed Nov. 7, 2012, which is incorporated by reference in its entirety.

TECHNICAL FIELD

The invention relates to a system for enabling brands to engage with mobile users.

U.S. PATENT DOCUMENTS REFERENCED

U.S. Pat. No. 7,945,244 by Delaet et al. (hereinafter "Delaet"), filed on Aug. 13, 2007 and titled "Method and Apparatus for Communicating using a plurality of identities" is hereby incorporated by reference in its entirety.

U.S. application Ser. No. 13/295,856 by Chris Horn et al. (hereinafter 'Horn') filed on Nov. 14, 2011 and titled "Method and System for Enabling Usage of Mobile Telephone Services on a Donor Device" is hereby incorporated by reference in its entirety.

U.S. application Ser. No. 13/880,640 by Rohit Jerath et al. (hereinafter 'Jerath') filed on Oct. 18, 2011 and titled "Method and System for Enabling shared Mobile Data Usage" is hereby incorporated by reference in its entirety.

BACKGROUND

Throughout this application, the term "brand" is used to mean any organization that provides goods or services. For example, a brand in this context can be any type of company, association, person, group, or organization. Moreover, the terms company, association, person, group, and organization are used interchangeably and the use of one should be understood to encompass the others.

The specifications set out by The 3rd Generation Partnership Project ('3GPP specifications') define the operation of mobile voice and data services within a telecommunications network. The term "3GPP specification" covers all GSM (including GPRS and EDGE), W-CDMA and LTE (including LTE-Advanced) specifications. All 3GPP specifications from the years 2000 through 2011 are hereby incorporated by reference in their entireties.

Throughout this application, standard telecom industry terms are used. The International Mobile Subscriber Identity (IMSI) is the unique number identifying the subscriber and is preprogrammed onto the subscriber's SIM card and held also in the Mobile Network Operator's Home Location Register (HLR) database. The Mobile Subscriber Integrated Services Directory Number (MSISDN) is the mobile telephone number given to a particular user.

The General Packet Radio Service (GPRS) is a technology used in mobile networks to carry Internet Protocol (IP) packets across networks.

The roles of the Serving GPRS Support Node (SGSN) and Gateway GPRS Support Node (GGSN) are well defined in the 3GPP specifications and are familiar to persons skilled in the art.

Throughout this application, the terms 'mobile station' and 'mobile device' are used. These can refer to any type of GSM device capable of sending or receiving data over a 'GPRS', '3G', WIMAX or 'LTE' network or their equivalents or evolutions. Furthermore, a 'mobile device' can also refer to the device compliant with the emerging Machine 2 Machine ('M2M') specifications being developed by ETSI (the European Telecommunications Standards Institute).

Throughout this application, the terms "API Server" and "MXGateway" are used. The API Server (Application Programming Interface Server) is a designation given to an element of the system that is responsible for interacting with the brands. The MXGateway is a designation given to a specific instance of an element of the system that is responsible for interacting with the mobile network operator's core network elements and also with the mobile application. The API Server and MXGateway can be implemented using computer software and/or hardware.

In many countries in the developed world, mobile phone penetration has far exceeded the 100% level, meaning that the mobile phone is now an essential tool in many peoples' daily lives. The emergence of smart mobile devices with associated mobile application ecosystems and application stores, for example those provided by the companies Apple and Google, is in widespread use across many mobile devices. These ecosystems open up new business opportunities for many companies.

As a result of this, many organizations have realized great potential in mobile devices and are experimenting with new levels of customer engagement using mobile technology. Indeed, some brands have decided to take the step of setting themselves up as a Mobile Virtual Network Operator (MVNO) so that they are able to sell mobile devices with associated mobile numbers and Subscriber Identity Module (SIM) cards. By setting themselves up as an MVNO, the brand can engage better with its customers, allowing the customer to feel connected to the brand by having a mobile number and, in some cases also a mobile device, provided by the brand itself. In addition, the brand can offer mobile services thereby providing an additional source of revenue.

However, MVNOs are time consuming and expensive to setup. They require the brand to conform to certain telecom regulations and require the brand to have a detailed knowledge of mobile technology and services that in many cases they will not have in-house. MVNOs also compete with mobile operators to attract subscribers away from the traditional networks, often requiring the end user to sign a new mobile contract and often to purchase a new device in the process.

There is therefore a need for a system that can lower the 'barrier of entry' for brands enabling them to engage with their customers with specific mobile identities on existing mobile network infrastructure and using existing mobile devices.

SUMMARY

In one aspect, the system described herein can provide the ability for identities to be managed and offered by organizations other than the mobile operator by interacting with a central API Server that in turn can interact with a network of MXGateway servers and end users using mobile applications. For example, a Brand can manage sponsored identities and how a user might receive credits on accounts related to those identities initiated by the Brand.

The system described herein provides a mechanism for a user to download a mobile application offered by a brand using a common ecosystem such as, for example, those provided by Apple and Google. The user registers the mobile application with the system described herein and as part of that registration process the user receives a unique sponsored mobile identity (for example an MSISDN) which is tied to the mobile application instance and is known by and may even be offered by the brand. Having received a sponsored mobile identity, a user can choose to make and receive calls, send messages and consume mobile data services using the sponsored identity. The user may do this in parallel to using his normal primary MSISDN using the same mobile device and same SIM card and using his existing mobile contract with his mobile operator. As part of the registration process, the brand is informed about the sponsored identity that the user is allocated by the system.

Some example use cases are given below:

A) User makes a call to the Brand's customer care department. The call is invoked from within the Brand's mobile application using the user's unique sponsored identity as the Calling Line Identity (CLI). The brand is able to identify the specific user calling and can provide an enhanced level of customer care if they so wish.

B) User can send or receive Short Message Service (SMS) or Multimedia Service (MMS) messages to or from the brand. Such messages can be used, for example, for customer care, advertising and promotional purposes.

C) User can consume mobile data services (for example, browse the web or check email), using his sponsored identity and related charging account. In this way the brand could offer bundles of mobile data.

D) Brand can call user on his unique sponsored identity and leave voicemail messages if no answer.

E) The brand can perform top-up actions on the user's prepaid balance for his sponsored identity.

F) The brand can offer loyalty or bonus points programmes such as those provided by companies such as Air Miles or Nector. The loyalty points accumulated by the user can be exchanged for airtime or data services consumed by the sponsored identity.

In an exemplary embodiment, the system for enabling at least one sponsored identity on a mobile device can have a mobile device having at least one mobile application, wherein each of the at least one mobile application has an assigned sponsored identity. The system can have at least one MXGateway instance located within a mobile network, wherein said at least one mobile application is configured to communicate a prefix and to indicate the at least one sponsored identity to the at least one MXGateway instance. The system can have an API Server capable of communication with at least one brand and the at least one MXGateway instance and a means for making a request to reserve the at least one sponsored identity with the API Server, wherein said API Server is configured to communicate with the at least one MXGateway instance, wherein the at least one MXGateway instance is configured to allocate a range or list of the at least one sponsored identity. The system can also have a mapping table for converting the prefix to the at least one sponsored identity.

An aspect of the system can further have a Mobile Operator charging system, wherein the at least one MXGateway instance can be configured to interact with the Mobile Operator charging system so that each unique sponsored identity has a unique account. Another aspect of the system the at least one MXGateway instance can have a stored list of available prefixes and a timer, wherein the at least one MXGateway instance is configured to communicate an available prefix from the available prefixes to the at least one mobile application instance, wherein the at least one mobile application comprises a timer.

An aspect of the system can have a means for prepending said prefix to a destination address and for sending Short Messages to a Short Message Service Centre. The system can also have a means for prepending said prefix to the at least one sponsored identity and for sending Multimedia Messages to a Multimedia Message Service Centre.

In an exemplary embodiment a system for enabling at least one sponsored identity on a mobile device can include providing a mobile device having at least one mobile application, wherein each of the at least one mobile application has an assigned sponsored identity, providing at least one MXGateway instance located within a mobile network, and providing an API Server capable of communication with at least one brand and the at least one MXGateway instance, wherein the API Server receives a brand request to reserve the at least one sponsored identity. The API Server can communicate with the at least one MXGateway instance, and the at least one MXGateway instance allocates a range or list comprising at least some of the at least one sponsored identity. The mobile application can use a prefix to indicate to the at least one MXGateway instance the sponsored identity used for mobile originated calls, and the at least one MXGateway instance can use a mapping table to convert a unique prefix to a sponsored identity to be used by the at least one mobile application when originating calls or messages or when using mobile data services.

An aspect of the system can further include the at least one MXGateway instance interacting with a Mobile Operator's charging system so that each unique sponsored identity has its own prepaid or postpaid account. A pool of available prefixes can be maintained by the at least one MXGateway instance and the prefix can be communicated to the at least one mobile application instance using a mechanism of two timers. A first timer can be held in the at least one mobile application and a second timer held in the at least one MXGateway instance. In an aspect of the system the prefix can be used to indicate the at least one sponsored identity and the prefix can be prepended to a destination address by the at least one mobile application instance and used for sending Short Messages to a Short Message Service Centre. The system can include the prefix being used to indicate the at least one sponsored identity and the prefix can be prepended to a destination address by the at least one mobile application instance and used for sending Multimedia Messages to a Multimedia Message Service Centre.

Other aspects, embodiments, and features will be apparent from the following description, the drawings, and the claims.

DETAILED DESCRIPTION

A system for sponsored user identities is described herein. The system can have a network server which can be located, for example, within a Mobile Network Operator's network, providing functionality to allow multiple user identities (for example mobile phone numbers) to co-exist at the same time on the same device using a single Subscriber Identity Module (SIM) card residing within said device. The network server can interact with the Mobile Network Operator's charging systems to credit and debit accounts tied to the user identities, and the network server can interact with an API (Application Programming Interface) gateway which can be located in or outside of the Mobile Network Operator's network. The API Server can interact with one or more mobile client applications residing on a mobile device. Each mobile client application can act as at least one user identity and the subscriber using the mobile client application and its user identity as a 'virtual mobile telephone' to, for example, make and receive calls, send and receive text messages, use mobile data services such as email and web browsing.

Figure 1:
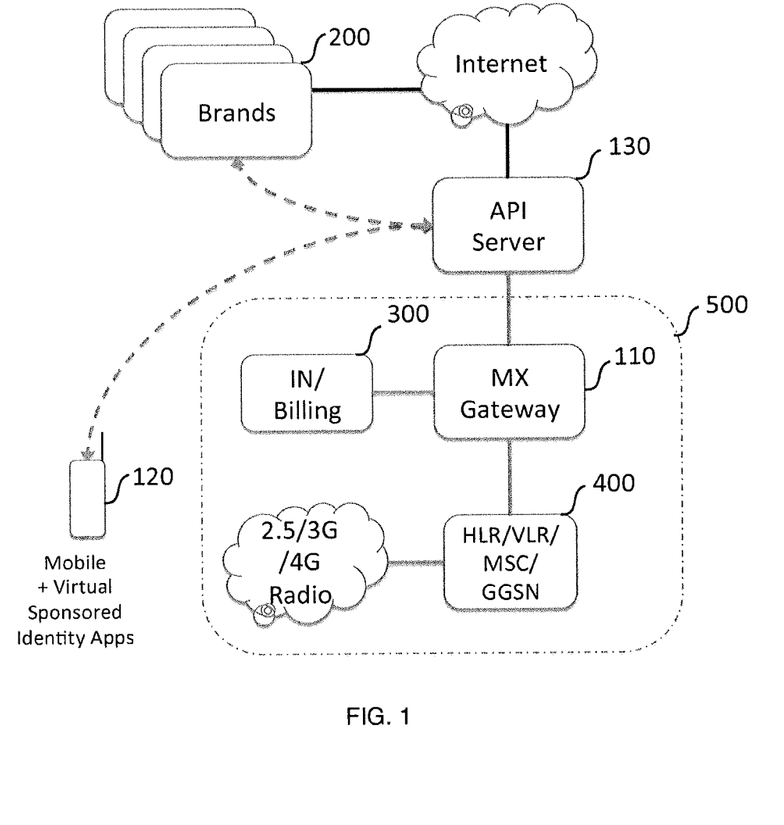
FIG. 1 depicts the system for the Sponsored User Identities at a high level.

FIG. 1 depicts the system for the Sponsored User Identities at a high level. The system can have one or more brands (200) interacting with an API Server (130) using an Internet Protocol (IP) based interface. The API server (130) can responsible for policy control, authorization and for routing of requests from a plurality of Brands (200) to a plurality of MXGateway (110) instances residing within a plurality of Mobile Operator core networks (500). It should be noted that FIG. 1 shows only one Mobile Operator Network (500). The system, however, enables a plurality of Mobile Operator Networks and associated MXGateway (110) instances to co-exist. The MXGateway (110) instance can be responsible for managing a plurality of user identities, each registered with a Mobile Application instance executing on a Mobile Device with said Mobile Device, for example, having a single IMSI and SIM card registered with a Mobile Network Operator (120).

FIG. 1 also illustrates components of the Mobile Network Operator's core network with which each MXGateway (110) instance can be integrated. The MXGateway (110) can communicate with the Home Location Register (HLR), Visitor Location Register (VLR), Mobile Switching Centre (MSC) and GPRS Gateway Support Node (GGSN) (400). The integration points are well defined and set out in the 3GPP ($3^{rd}$ Generation Partnership Project) specifications using Signaling System No 7 (SS7) protocols and, in the case of the GGSN, using the General Packet Radio Service (GPRS) Tunneling Protocol (GTP).

Brand Registration

So that a Brand may reserve identity ranges and make identity numbers available to its user base, the Brand can register itself with the API Server. A System Administrator of the API Server could be involved in this process. Various Brand credentials could be held in the API Server's database ('MXGateway Table'), for example, the Brand name, address, and a list of mobile network operators and associated territories (Regions) in which the Brand wishes to offer the Sponsored Identities. This registration process could include commercial and contractual terms agreed between the Brand and entities such as the API Server provider and the Mobile Network Operator.

Brand Identity Reservation

A Brand can reserve user identities with the API Server, for example, after registering itself with the API Server. The API Server can interact with the MXGateways (in one or more Regions as required), to ensure that these identity ranges are made available to the users within a particular Region and within the domain of a particular Mobile Network Operator.

Figure 2:
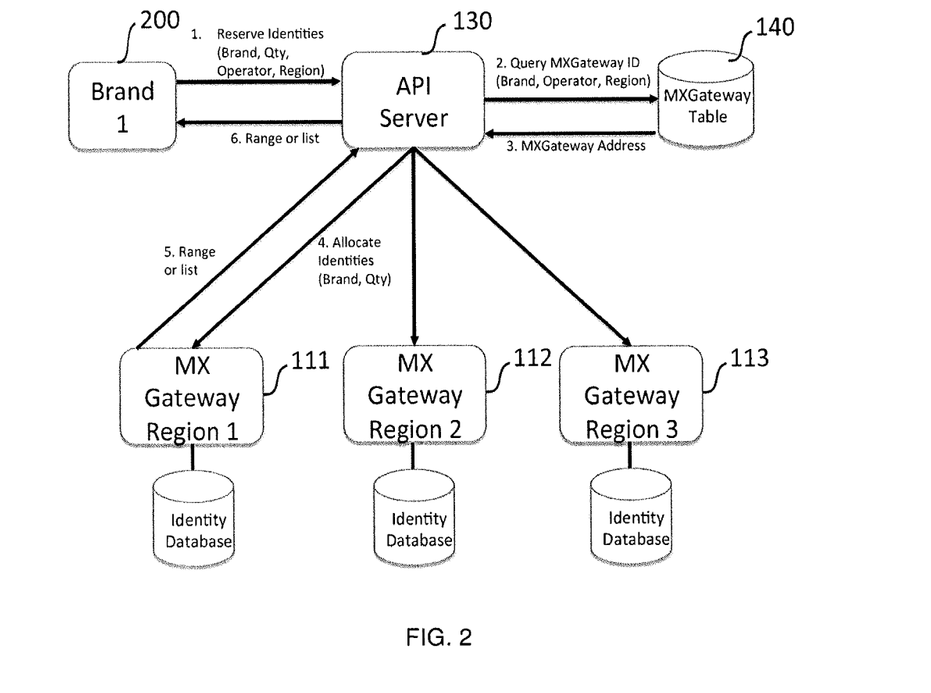
FIG. 2 a typical deployment of the System, showing by way of example, a Brand making a request to reserve an identity range for a given region

An example process of a Brand reserving identities is detailed in FIG. 2. In Step 1, a Brand (200) can make a request to an API Server (130) specifying, for example, Brand (Brand name or Brand identifier), Qty (Quantity), Operator (Mobile Network Operator name or identifier), and Region (Region name or identifier). In step 2, the API Server (130) can first identify the particular MXGateway that is responsible for serving the users within the specified domain. The API Server (130) therefore queries its MXGateway Table (140) specifying, for example, the Brand, Mobile Network Operator and Region. The result of this query can be an address of an MXGateway instance (i.e. any identifier, for example, an Internet Protocol Address or Domain Name Service (DNS) equivalent name). Having retrieved the MXGateway address, the API Server (130) can then make a request to allocate identities to the MXGateway, using the MXGateway address. The request can include, for example, the Brand and the quantity of identities being requested.

The MXGateway instance can mark the requested number of identities as "reserved" and return, in Step 5, the range of reserved identities to the API Server (130). In an embodiment, the MXGateway can, in Step 5, return a list of specific identities it has reserved. In Step 6, the API Server (130) can return the range or list of identities to the Brand (200).

It should be noted the above process is given by way of non-limiting example and the process of a Brand reserving user identities with the system can be different to that detailed here.

Mobile Application Instances

Figure 3:
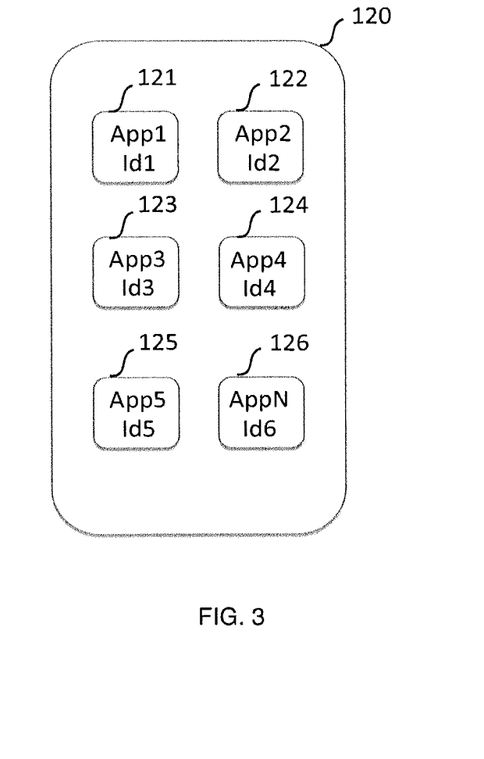
FIG. 3 illustrates multiple applications residing on a single mobile device with each application having its own unique user identity

FIG. 3 shows by way of example six mobile application instances (numbered 121 through 126) residing within one mobile device (120). Once registered with the system, each mobile application instance is assigned a unique user identity (numbered Id1 through Id6).

Mobile Application Registration

A user can invoke an instance of a mobile application with said mobile application instance having an assigned sponsored user identity ('Sponsored ID'), for example, an MSISDN. So that a mobile application instance can be assigned a Sponsored ID, it could register with the system.

Figure 4:
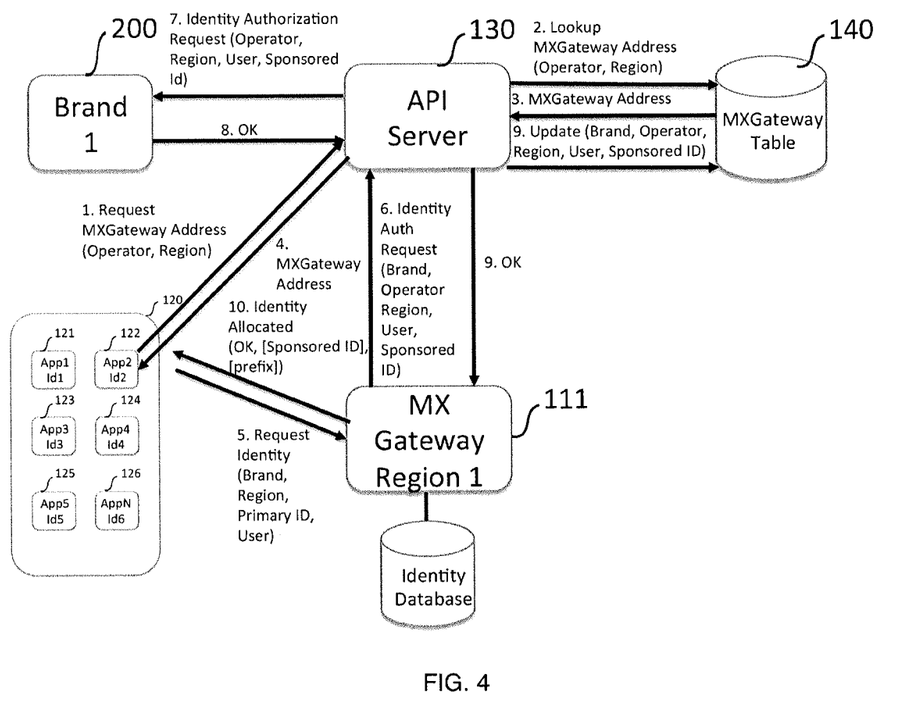
FIG. 4 shows a sequence flow of messages that are required when a user first downloads and sets up the mobile application with its associated identity

An example process of a mobile application registering itself with the system is detailed in FIG. 4. In Step 1, a mobile application instance (122) residing within a mobile device (120) can make a request to the API Server (130) to identify the address of the MXGateway with which it should communicate. The request contains, for example the Mobile Network Operator (name or identifier) and the Region (name or identifier). The mobile application instance might for example be preconfigured with an IP address or DNS address of the API Server. The Mobile Application instance might also be preconfigured with the Mobile Network Operator and/or Region of the system with which it should communicate. In Step 2, upon receiving the request, the API Server (130) queries the MXGateway Table (140) to identify the address of the MXGateway instance. In Step 3, the API Server (130) can receive the MXGateway address. In Step 4, the API Server (130) then responds to the mobile application instance (122) with the MXGateway Address. Now that the mobile application instance (122) knows the address of the MXGateway instance, it can submit, in Step 5, a request to reserve Sponsored ID to the MXGateway instance (111), specifying for example, the Brand, the Region, details of the user operating the mobile device, and the user's Primary ID (for example MSISDN). These details may be useful to the Brand (or indeed the Mobile Network Operator) so that it can identify the real user behind the Sponsored ID. At least the Primary ID and the sponsored ID can be held in the MXGateway instance (111) identity database. In Step 6, the MXGateway instance (111) can allocate an identity from its list of reserved identities corresponding to the specified brand and then make a request to the API Server (130). The request can contain, for example, the Brand, Region, Sponsored Identity and details of the user. In Step 7, the API Server (130) informs the Brand (200) that a request is being made to register a Sponsored ID by a mobile application instance. The request can include for example the Mobile Network Operator, the Region, the Sponsored ID being reserved and details of the user that it has received from the mobile application instance (122). Upon receiving the request, the Brand (200) must decide whether to allow or deny the request. FIG. 4 shows the successful case where the Brand (200) has decided to allow the request and hence in Step 8, Brand (200) responds with "OK" to the API Server (130). In step 9, API Server (130) can update its MXGateway Table (140) with details of the user comprising for example, Brand, Operator, Region, User and Sponsored ID. Next, API Server (130) in Step 9 responds with "OK" to MXGateway instance (111). In Step 10, MXGateway instance (111) responding with "OK" to the mobile application instance (122) and optionally including the prefix corresponding to the brand (see 'Option 1—fixed mapping of Prefixes to Mobile Application Instances') and optionally including the Sponsored ID. The Sponsored ID is not actually needed to be known by the mobile application instance except that it may be useful to inform the user of the Sponsored ID. The mobile application instance (122) stores the Prefix for later re-use.

It should be noted the above process is given by way of example and the process of a Mobile Application registering user identities with the system can be different to that detailed here.

Prefix Management for Mobile Originated Calls, SMS and MMS Messages

The MXGateway (111) can be responsible for ensuring that the correct Sponsored ID is used in outgoing calls, Short Message Service (SMS) and MultiMedia Service (MMS) messages. As identified by Horn, the called party number or destination number of the call or message could be prefixed with a sequence, for example of 3 or 4 digits to cause the call or message to be routed by the mobile network operator's core network to the MXGateway (111). The prefix can identify the specific mobile application instance that is originating the call or message. The MXGateway instance may then strip off the prefix and re-route the call or message onwards within the mobile network, before doing so replacing the originating number (calling party number or source address) with the Sponsored ID corresponding to the registered mobile application instance.

A mechanism is therefore needed within the MXGateway to manage the use of prefixes corresponding to mobile application instances and user identities. The mechanism can ensure that a prefix always uniquely identifies a mobile application instance. The mechanism could inform the mobile application instance as to which prefix to use when it originates calls or SMS or MMS messages. Since, according to the 3GPP specifications, a destination number has a maximum length of 20 digits, the prefix typically needs to be restricted in length allowing enough space to carry the user identity itself.

Two options for prefix management are described below:

Option 1—Fixed Mapping of Prefixes to Mobile Application Instances

With this option, the MXGateway (111) can maintain a mapping table consisting of the user's primary user identity, also held in the HLR (e.g. MSISDN), Brand (name or identity), prefix and Sponsored ID. The limitation with this option is that the number of brands allowed to be supported by the MXGateway instance is exactly the same as the number of prefixes. So a prefix length of 4 digits will provide support for a maximum of 10,000 brands. In this embodiment, the prefix obtained by the MXGateway cross referencing said prefix with Brand ID and the prefix is passed to the mobile application instance (122) in Step 10 of FIG. 4.

Option 2—Pooling of Prefixes

With this option, the MXGateway can maintain a pool of prefixes against Brand IDs. Here, the mobile application instance can make a request to the MXGateway prior to originating a call or message to request a prefix. Mobile application instance also at this point can start a timer $T^1$. MXGateway can take the next available prefix from a pool and mark as reserved. MXGateway can inform the mobile application instance of the prefix to use for the duration of timer $T^1$. MXGateway then can start timer $T^2$. Upon expiration of timer $T^1$, said mobile application instance is required to request a new prefix from MXGateway before it may originate any further calls or messages. Upon expiration of timer $T^2$, MXGateway can return the prefix to the pool of available prefixes.

With this option, the MXGateway number of available prefixes is approximately equal to the number of simultaneous calls that may be handled by the MXGateway (assuming that the two timers are kept within the duration of a typical call).

It should be noted the above options are given by way of example and the process of managing prefixes and can be different to that detailed here. It should also be noted that the prefixes maintained by the MXGateway are only required to be unique within the domain of one Mobile Network Operator.

Mobile Terminating Calls, SMS and MMS Messages

The process for handling of mobile terminating calls, SMS and MMS messages is well specified in Horn's application and is incorporated herein in its entirety. The mechanism entails the System Server (e.g. MXGateway) emulating the behavior of a Visitor Location Register (VLR).

Brand Top-Up of Sponsored Identity Account

Figure 5:
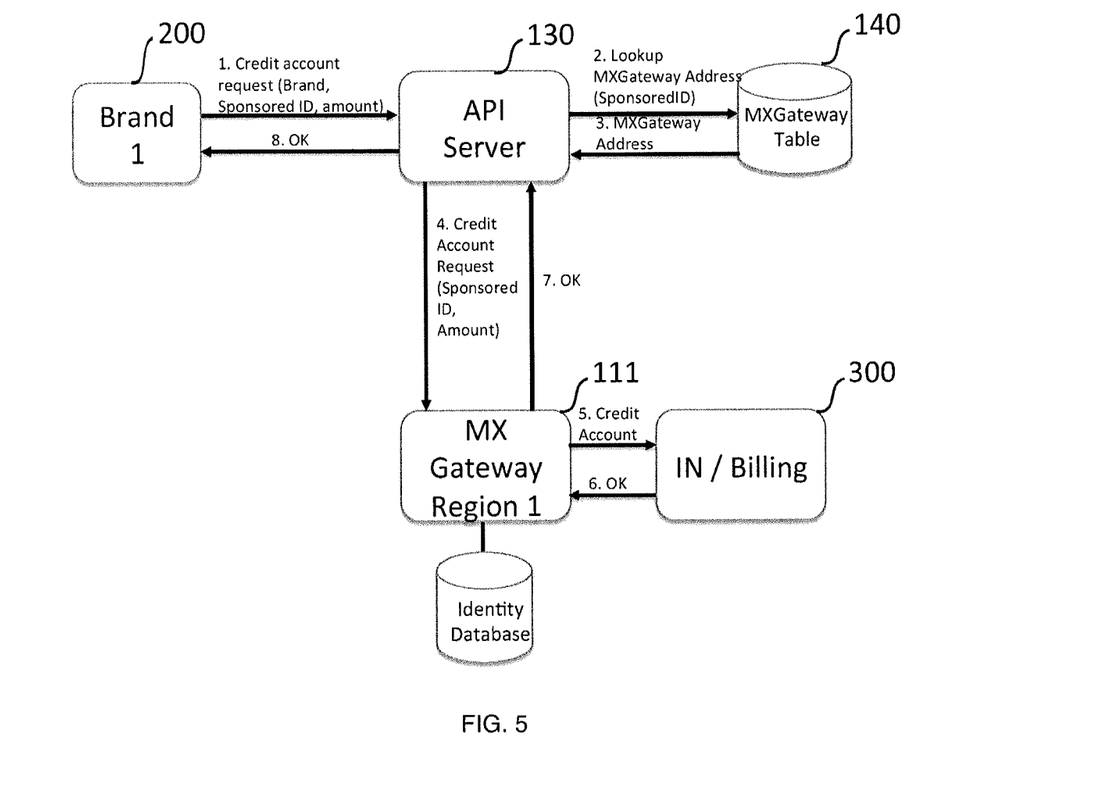
FIG. 5 shows a sequence flow of a brand making a top-up to a user's sponsored identity

FIG. 5 shows an example flow of a Brand topping up an account linked to a user's sponsored identity. This scenario can, for example, be used by Brands to reward users in the form of call or message or data credit for using products and services provided by the Brand. In Step 1, Brand (200) can make a request to API Server (130) to credit a user's sponsored identity account held in the operator's charging system. The request can contain, for example, the Brand (identity or name), the Sponsored ID and the amount (for example, in a currency agreed between the brand and the API Server provider or between the Brand and the Mobile Operator directly). In Steps 2 and 3, the API Server can perform a lookup to the MXGateway Table (140) to identify the address of the MXGateway instance managing the Sponsored ID. In Step 4, the API Server (130) can send the credit request towards the MXGateway instance (111) containing the Sponsored Id and amount. In Steps 5 and 6, the MXGateway instance (111) can update the billing account linked to the Sponsored Identity held in the operator's IN/Billing System (300).

Charging Accounts

Each sponsored identity can have prepaid or postpaid accounts managed by the MXGateway by interfacing with the IN (Intelligent Network) or charging systems of the operator, since the sponsored identity would be held in the operator's IN and/or charging systems, and calls or SMS messages would be routed via the MXGateway as described in Horn.

Data Charging

Jerath, incorporated herein in its entirety, describes how a GTP messages can be intercepted by a system server to replace the subscriber's IMSI with a secondary IMSI for the purpose of supporting charging to multiple virtual identities from a shared mobile device with a single SIM card. This mechanism can be further enhanced within a system for sponsored identities by the mobile application providing prior indication to the MXGateway that a sponsored identity wishes to consume mobile data services. With this mechanism, the mobile application can inform the MXGateway of its prefix that it was allocated during registration. As described above, the prefix can also be given to the mobile application prior to commencement of transmitting mobile data. Once data consumption begins, the MXGateway intercepts GTP traffic (as described by Jerath) replacing the primary IMSI with a virtual IMSI. The virtual IMSI is held in the sponsored identity database within the MXGateway. The virtual IMSI is held in a table alongside the prefix and the primary IMSI.

User Credit Checking

A user can initiate a request from the mobile application instance to check available credit on the sponsored identity. This would be achieved for example by the mobile application sending a request to the MXGateway instance (111) and the MXGateway instance (111) in turn querying the credit on the sponsored identity account held in the IN/Billing System (300) and said credit being returned by the MXGateway instance (111) to the mobile application instance.

The various techniques, methods, and systems described above can be implemented in part or in whole using computer-based systems and methods. Additionally, computer-based systems and methods can be used to augment or enhance the functionality described above, increase the speed at which the functions can be performed, and provide additional features and aspects as a part of or in addition to those described elsewhere in this document. Various computer-based systems, methods and implementations in accordance with the above-described technology are presented below.

In one implementation, a general-purpose computer can have an internal or external memory for storing data and programs such as an operating system (e.g., DOS, Windows 2000™, Windows XP™, Windows NT™, OS/2, iOS, UNIX or Linux) and one or more application programs. Examples of application programs include computer programs implementing the techniques described herein, authoring applications (e.g., word processing programs, database programs, spreadsheet programs, simulation programs, engineering programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer or Google Chrome) capable of rendering standard Internet content and other content formatted according to standard protocols such as the Hypertext Transfer Protocol (HTTP), HTTP Secure, or Secure Hypertext Transfer Protocol.

One or more of the application programs can be installed on the internal or external storage of the general-purpose computer. Alternatively, in another implementation, application programs can be externally stored in or performed by one or more device(s) external to the general-purpose computer.

The general-purpose computer includes a central processing unit (CPU) for executing instructions in response to commands, and a communication device for sending and receiving data. One example of the communication device is a modem. Other examples include a transceiver, a communication card, a satellite dish, an antenna, a network adapter, network interface card, mobile internet device, or some other mechanism capable of transmitting and receiving data over a communications link through a wired or wireless data pathway.

The general-purpose computer can include an input/output interface that enables wired or wireless connection to various peripheral devices. Examples of peripheral devices include, but are not limited to, a mouse, a mobile phone, a personal digital assistant (PDA), a smart phone, a tablet computer, a keyboard, a display monitor with or without a touch screen input, and an audiovisual input device. In another implementation, the peripheral devices can themselves include the functionality of the general-purpose computer. For example, the mobile phone or the PDA can include computing and networking capabilities and function as a general purpose computer by accessing the delivery network and communicating with other computer systems. Examples of a delivery network include the Internet, the World Wide Web, WANs, LANs, analog or digital wired and wireless telephone networks (e.g., Public Switched Telephone Network (PSTN), Integrated Services Digital Network (ISDN), or Digital Subscriber Line (xDSL)), radio, television, cable, or satellite systems, and other delivery mechanisms for carrying data. A communications link can include communication pathways that enable communications through one or more delivery networks.

In one implementation, a processor-based system (e.g., a general-purpose computer) can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, solid state drive, or flash memory devices including memory cards, USB flash drives, solid-state drives, etc. The removable storage drive reads from or writes to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as can be found in video game devices), a removable memory chip (such as an EPROM or PROM) and associated socket, and other removable storage units and interfaces, which allow software and data to be transferred from the removable storage unit to the computer system.

In one embodiment, the computer system can also include a communications interface that allows software and data to be transferred between the computer system and external devices. Examples of communications interfaces can include a modem, a network interface (such as, for example, an Ethernet card), a communications port, and a PCMCIA slot and card. Software and data transferred via a communications interface are in the form of signals, which can be electronic, electromagnetic, optical or other signals capable of being received by a communications interface. These signals are provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer usable medium" are generally used to refer to media such as a removable storage device, a disk capable of installation in a disk drive, and signals on a channel. These computer program products provide software or program instructions to a computer system.

Computer programs (also called computer control logic) are stored in main memory or secondary memory. Computer programs can also be received via a communications interface. Such computer programs, when executed, enable the computer system to perform the features as discussed herein. In particular, the computer programs, when executed, enable the processor to perform the described techniques. Accordingly, such computer programs represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, causes the processor to perform the functions of the techniques described herein.

In another embodiment, the elements are implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements are implanted using a combination of both hardware and software.

In another embodiment, the computer-based methods can be accessed or implemented over the World Wide Web by providing access via a Web Page to the methods described herein. Accordingly, the Web Page is identified by a Universal Resource Locator (URL). The URL denotes both the server and the particular file or page on the server. In this embodiment, it is envisioned that a client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hypertext transport protocol or HTTP). The selected page is then displayed to the user on the client's display screen. The client can then cause the server containing a computer program to launch an application to, for example, perform an analysis according to the described techniques. In another implementation, the server can download an application to be run on the client to perform an analysis according to the described techniques.

Other embodiments are within the scope of the following claims.

What is claimed is:

1. A system for enabling at least one sponsored identity, comprising:
 a mobile device communicatively coupled to a mobile network, the mobile device having at least one mobile application offered by a brand, each of the at least one mobile application having an assigned sponsored identity associated with the brand, the assigned sponsored identity being separate and distinct from a mobile telephone number assigned to the mobile device by a mobile network operator that is separate and distinct from the brand, one or more communications performed by the mobile application being managed by the brand using the sponsored assigned identity;
 at least one server instance located within the mobile network, wherein the at least one mobile application communicates a prefix comprising a sequence of digits indicating the at least one sponsored identity to the at least one server instance and the server instance allocates at least one of a range and a list of the at least one sponsored identity, the prefix being unique to the mobile application at least for a given period of time and associated with the brand;
 an application server that communicates with the brand and the at least one server instance, the application server receiving a request from the brand to reserve the at least one sponsored identity with the application server; and
 a mapping table to convert the prefix to the at least one sponsored identity.

2. The system of claim 1, further comprising a charging system, wherein the at least one server instance interacts with the charging system so that each unique sponsored identity has a unique account.

3. The system of claim 1, wherein the at least one server instance comprises a stored list of available prefixes and a timer, wherein the at least one server instance communicates an available prefix from the available prefixes to the at least one mobile application, and wherein the at least one mobile application comprises a timer.

4. The system of claim 1, further comprising means for prepending the prefix to a destination address and for sending Short Messages to a Short Message Service Centre.

5. The system of claim 1, further comprising means for prepending the prefix to the at least one sponsored identity and for sending Multimedia Messages to a Multimedia Message Service Centre.

6. A system for enabling at least one sponsored identity, comprising:
 a mobile device communicatively coupled to a mobile network, the mobile device having at least one mobile application offered by a brand, each of the at least one mobile application having an assigned sponsored identity associated with the brand, the assigned sponsored identity being separate and distinct from a mobile telephone number assigned to the mobile device by a mobile network operator that is separate and distinct from the brand, one or more communications performed by the mobile application being managed by the brand using the sponsored assigned identity;
 at least one server instance located within the mobile network;
 an application server capable of communication with at least the brand and the at least one server instance, the application server receiving a request from the brand-to reserve the at least one sponsored identity; and
 when the application server communicates with the at least one server instance:
 the at least one server instance allocates a at least one of a range and a list comprising at least some of the at least one sponsored identity;
 the mobile application uses a prefix comprising a sequence of digits indicating the sponsored identify used for mobile originated calls to the at least one server instance; and
 the at least one server instance uses a mapping table to convert a unique prefix to a sponsored identity to be used by the at least one mobile application when originating calls indicating the at least one sponsored identity to the at least one server instance, the prefix being unique to the mobile application at least for a given period of time and is associated with the brand.

7. The system of claim 6, further comprising the at least one server instance interacting with a charging system so that each unique sponsored identity has at least one of its own prepaid and postpaid account.

8. The system of claim wherein a pool of available prefixes is maintained by the at least one server instance and where the prefix is communicated to the at least one mobile application using a mechanism of two timers, a first timer held in the at least one mobile application and a second timer held in the at least one server instance.

9. The system of claim 6, wherein the prefix is used to indicate the at least one sponsored identity and the prefix is prepended to a destination address by the at least one mobile application instance and used for sending Short Messages to a Short Message Service Centre.

10. The system of claim 6, wherein the prefix is used to indicate the at least one sponsored identity and the prefix is prepended to a destination address by the at least one mobile application instance and used for sending Multimedia Messages to a Multimedia Message Service Centre.

* * * * *